(12) United States Patent
Wiemer

(10) Patent No.: US 10,940,450 B2
(45) Date of Patent: Mar. 9, 2021

(54) SYSTEMS FOR INFUSING A COOLED LIQUID WITH A GAS TO FORM A GAS-INFUSED BEVERAGE

(71) Applicant: Cornelius Deutschland, Langenfeld (DE)

(72) Inventor: Klaus Wiemer, Muehlheim (DE)

(73) Assignee: Cornelius Deutschland, Langenfeld (DE)

( * ) Notice: Subject to any disclaimer, the term of this patent is extended or adjusted under 35 U.S.C. 154(b) by 194 days.

(21) Appl. No.: 16/105,589

(22) Filed: Aug. 20, 2018

(65) Prior Publication Data
US 2019/0054430 A1 Feb. 21, 2019

Related U.S. Application Data

(60) Provisional application No. 62/547,940, filed on Aug. 21, 2017.

(51) Int. Cl.
*B01F 3/04* (2006.01)
*A23L 2/54* (2006.01)
(Continued)

(52) U.S. Cl.
CPC .......... *B01F 3/04808* (2013.01); *A23L 2/54* (2013.01); *B01F 3/2014* (2013.01); *B01F 13/042* (2013.01); *B01F 15/00863* (2013.01); *B01F 15/065* (2013.01); *B67D 1/0067* (2013.01); *B67D 1/0861* (2013.01); (Continued)

(58) Field of Classification Search
CPC .......... B01F 3/04808; B01F 2215/0022; B01F 3/2014; B01F 13/042; B01F 2003/049; B01F 2015/061; A23V 2002/00; A23L 2/54
See application file for complete search history.

(56) References Cited

U.S. PATENT DOCUMENTS 2,496,466 A * 2/1950 Graham ................ F25D 31/002
                                                  62/201
2,514,463 A * 7/1950 Bayers, Jr. ........... B67D 1/0057
                                                  261/130
(Continued)

FOREIGN PATENT DOCUMENTS

DE          644273       * 4/1937
DE    202010006702 U1    9/2010
(Continued)

OTHER PUBLICATIONS

EPO translation of DE 644273 (Year: 1937).*
(Continued)

*Primary Examiner* — Stephen Hobson
(74) *Attorney, Agent, or Firm* — Andrus Intellectual Property Law, LLP (57) ABSTRACT

A system is for infusing liquid with a gas to form a gas-infused beverage. The system has a tank with first and second cavities. A refrigeration circuit refrigerates the tank and the contents of the first and second cavities. The liquid is supplied to the first cavity and cooled therein by the refrigeration circuit and then supplied to the second cavity and infused with gas therein to thereby form the gas-infused beverage. The gas-infused beverage is then supplied to a beverage outlet for dispensing to a user.

23 Claims, 7 Drawing Sheets (51) Int. Cl.
  *B01F 3/20* (2006.01)
  *B01F 13/04* (2006.01)
  *B01F 15/06* (2006.01)
  *F25D 31/00* (2006.01)
  *F28D 20/00* (2006.01)
  *F28D 1/06* (2006.01)
  *B67D 1/00* (2006.01)
  *B01F 15/00* (2006.01)
  *B67D 1/08* (2006.01)

(52) U.S. Cl.
  CPC ............. *F25D 31/002* (2013.01); *F28D 1/06* (2013.01); *F28D 20/00* (2013.01); *A23V 2002/00* (2013.01); *B01F 2003/049* (2013.01); *B01F 2015/061* (2013.01); *B01F 2215/0022* (2013.01); *F28D 2020/0065* (2013.01)

(56) References Cited

U.S. PATENT DOCUMENTS

| | | | | |
|---|---|---|---|---|
| 2,601,493 | A | | 6/1952 | Barr |
| 3,834,178 | A | * | 9/1974 | Pink ...................... F25D 23/126 62/338 |
| 4,521,349 | A | * | 6/1985 | Weber ........................ C02F 1/24 261/93 |
| 4,764,315 | A | * | 8/1988 | Brusa .................. B01F 3/04808 261/123 |
| 5,124,088 | A | * | 6/1992 | Stumphauzer ....... B67D 1/0057 222/129.1 |
| 5,152,935 | A | * | 10/1992 | Robertson ........... B01F 3/04808 261/140.1 |
| 5,310,088 | A | * | 5/1994 | Burrows .............. B67D 1/0057 222/129.1 |
| 5,399,300 | A | * | 3/1995 | Notar ................... B67D 1/0067 261/130 |
| 6,202,894 | B1 | * | 3/2001 | Struminski .......... B67D 1/0037 222/129.3 |
| 8,376,608 | B2 | * | 2/2013 | Zimmerman ..... B01F 15/00883 366/144 |
| 10,093,530 | B2 | * | 10/2018 | Mackey ................ B67D 3/0009 |
| 2018/0280552 | A1 | * | 10/2018 | Hanano ..................... B01F 1/00 |
| 2019/0314773 | A1 | * | 10/2019 | Yui ....................... B01F 13/089 |

FOREIGN PATENT DOCUMENTS

| | | |
|---|---|---|
| DE | 102009053672 A1 | 5/2011 |
| EP | 0193873 | 9/1986 |
| GB | 2483073 A | 2/2012 |
| WO | 2015151868 | 10/2015 |

OTHER PUBLICATIONS

"Solenoid valve" Wikipedia published Apr. 18, 2015 accessed at <https://en.wikipedia.org/w/index.php?title=Solenoid_valve&oldid=657041148> (Year: 2015).*

Partial International Search Report and Provisional Written Opinion, PCT/IB2018/001065, dated May 22, 2019.

International Search Report and the Written Opinion for PCT/IB2018/001065, dated Sep. 19, 2019.

International Preliminary Report on Patentability for PCT/IB2018/001065, dated Feb. 25, 2020.

* cited by examiner

SYSTEMS FOR INFUSING A COOLED LIQUID WITH A GAS TO FORM A GAS-INFUSED BEVERAGE

CROSS-REFERENCE TO RELATED APPLICATION

The present application is based on and claims priority to U.S. Provisional Patent Application No. 62/547,940 filed Aug. 21, 2017, the disclosure of which is incorporated herein by reference.

FIELD

The present disclosure relates to systems for infusing liquids with gas to form gas-infused beverages.

BACKGROUND

The following patent application is incorporated herein by reference in entirety:

UK Patent Application No. GB 2,483,073 discloses a carbonator tank having a bowl and a lid. The lid is provided with an inlet for still water, an inlet for carbonating gas, and an outlet for carbonated water. A cooling coil is wrapped around and contacts an outer surface of the tank over substantially the whole length of the tank. The water inlet is connected to a cooling coil that contacts an outer surface of an evaporator coil. The cooling coil cools the still water delivered to the tank. The still water is either dispensed or injected into the tank to generate carbonated water.

SUMMARY

This Summary is provided to introduce a selection of concepts that are further described below in the Detailed Description of the Drawings. This Summary is not intended to identify key or essential features of the claimed subject matter, nor is it intended to be used as an aid in limiting the scope of the claimed subject matter.

In certain examples disclosed herein, a system is for infusing a liquid with a gas to form a gas-infused beverage. The system has a tank with first and second cavities. A refrigeration circuit refrigerates the tank and the contents of the first and second cavities. The liquid is supplied to the first cavity and cooled therein by the refrigeration circuit and then supplied to the second cavity and infused with gas therein to thereby form the gas-infused beverage. The gas-infused beverage is then supplied to an outlet for dispensing to a user.

BRIEF DESCRIPTION OF THE DRAWINGS

The present disclosure is described with reference to the following figures. The same numbers are used throughout the figures to reference like features and like components.

DETAILED DESCRIPTION OF THE DRAWINGS

Figure 1:
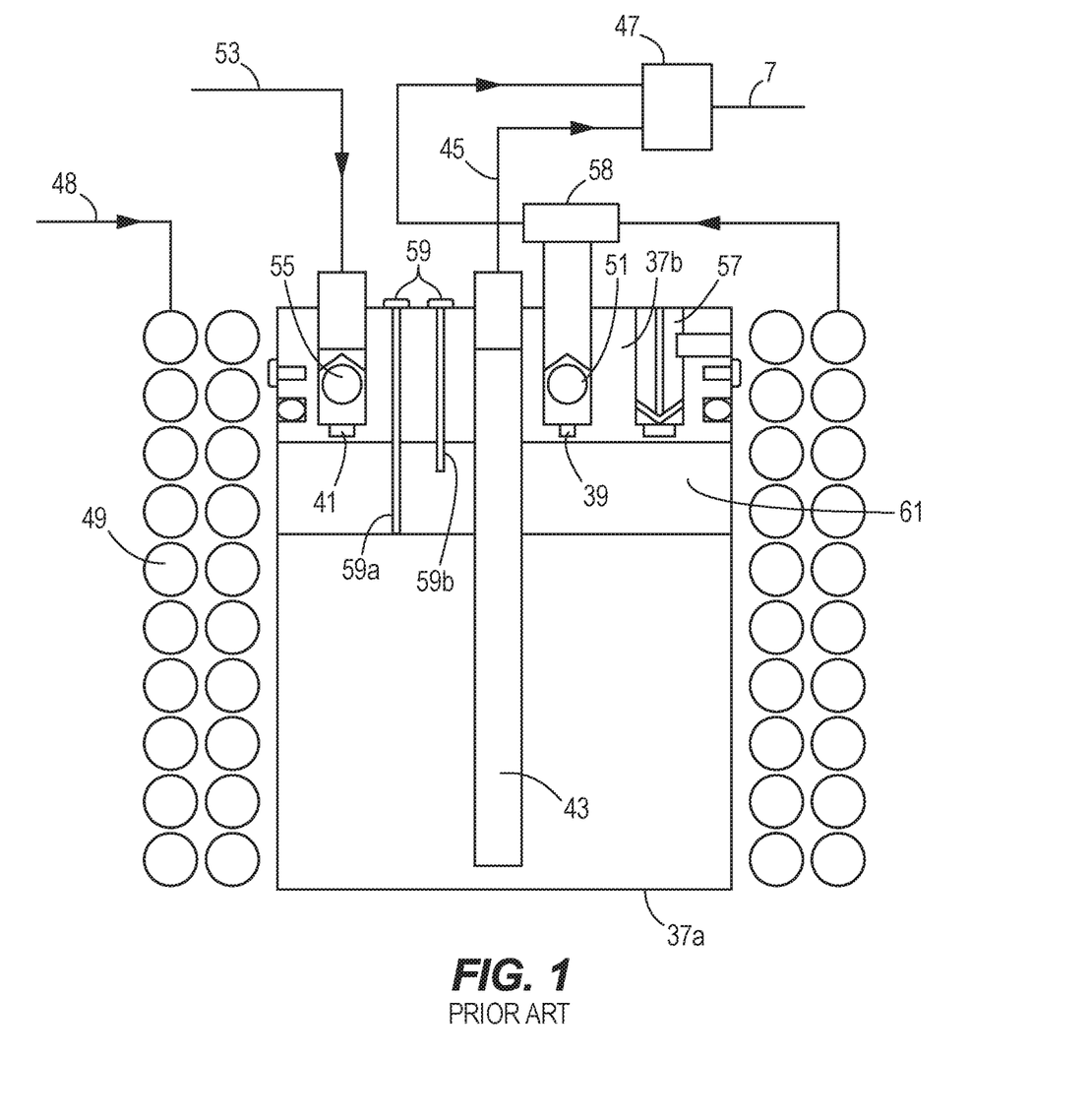
FIG. 1 is taken from UK Patent Application No. GB 2,483,073 and depicts a prior art carbonator with cooling system.

FIG. 1 is taken from UK Patent Application No. GB 2,483,073 and depicts a carbonator tank having a cylindrical bowl 37a and a lid or head 37b. The head 37b is provided with an inlet 39 for still water, an inlet 41 for carbonating gas, and an outlet 43 for carbonated water. The outlet 43 is in the form of a tube that extends close to the bottom of the cylindrical bowl 37a and is connected by a line 45 to a valve block 47 including a product outlet connector. The inlet 39 is connected to a water inlet connecter by a line 48 that includes a pump and a water pre-cool coil 49. A check valve 51 in the inlet 39 prevents back-flow of water. The inlet 41 is connected to a gas inlet connector by a line 53. A check valve 55 in the inlet 41 prevents back-flow of gas.

A T-connector 58 downstream of the pre-cool coil 49 splits the line 48 for connection to the inlet 39 to the carbonator tank and to the valve block 47. The valve block 47 is operable to supply still water from the line 48 or carbonated water from the line 45 to the product delivery line 7 according to user selection. In some applications, the valve block 47 may also be configured to supply a mixture of still water and carbonated water to the product delivery line 7. The ratio of still water and carbonated water in a mixture may be adjustable according to user selection.

The valve block 47 may include flow control means for one or both of the still water and carbonated water supplied from lines 45, 48 to the delivery line. The flow control means may be adjustable. In this embodiment, separate screw adjusters are provided for the lines 45 and 48 respectively. The flow control means may be set upon installation.

The head 37b of the carbonator tank further includes a safety valve 57 and a level probe assembly 59. The safety valve 57 is operable to release access pressure from a head space 61 within the carbonator tank. The level probe assembly 59 includes a pair of probes 59a, 59b for monitoring water level in the carbonator tank and controlling addition of water to the carbonator tank. In use, water is added to the carbonator tank when the water level falls to a minimum level as detected by one probe 59a until an upper level is reached as detected by the other probe 59b.

A refrigeration circuit, including a condenser, compressor, and evaporator, is utilized to cool the water as it is being added to and as it is stored in the carbonator tank. The '073 application discloses several embodiments having the pre-cool coil 49 wound around and/or wound adjacent to the external surface of an evaporator coil over substantially the length of the tank. Thermal contact between the respective coils and the tank achieves cooling of the beverage produced by the carbonator device.

Through research and experimentation, the present inventor has determined that the systems taught in the '073 application are somewhat limited with respect to the amount of cold still water available to the user on demand. The present disclosure is the result of the inventor's efforts to improve upon the concepts disclosed in the '073 application, and particularly efforts to provide more readily available, cooled still water and gas-infused beverage to the user.

Figure 2:
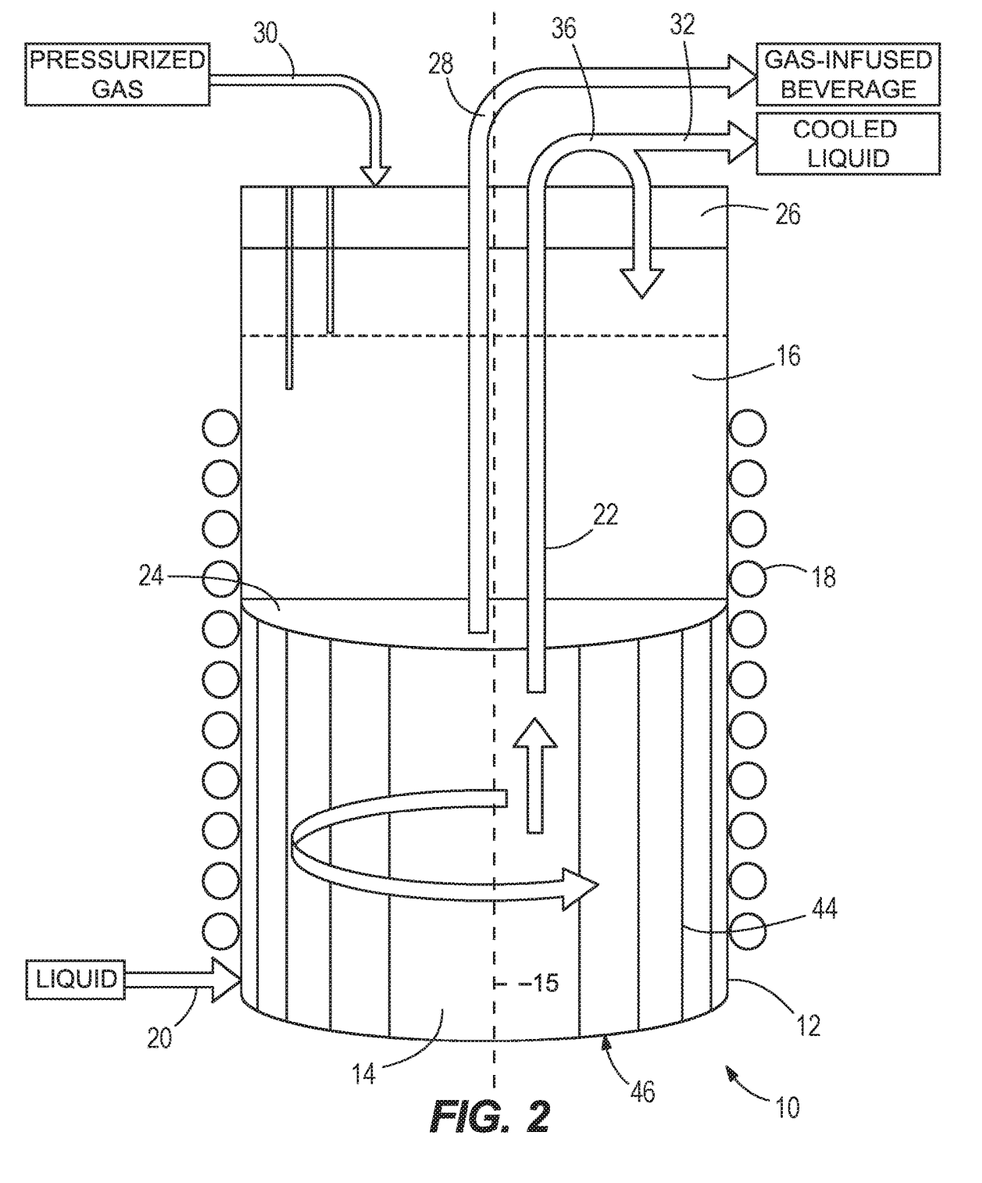
FIG. 2 is a schematic view of a system according to the present disclosure, for infusing a cooled liquid with a gas to form a gas-infused beverage.
Figure 3:
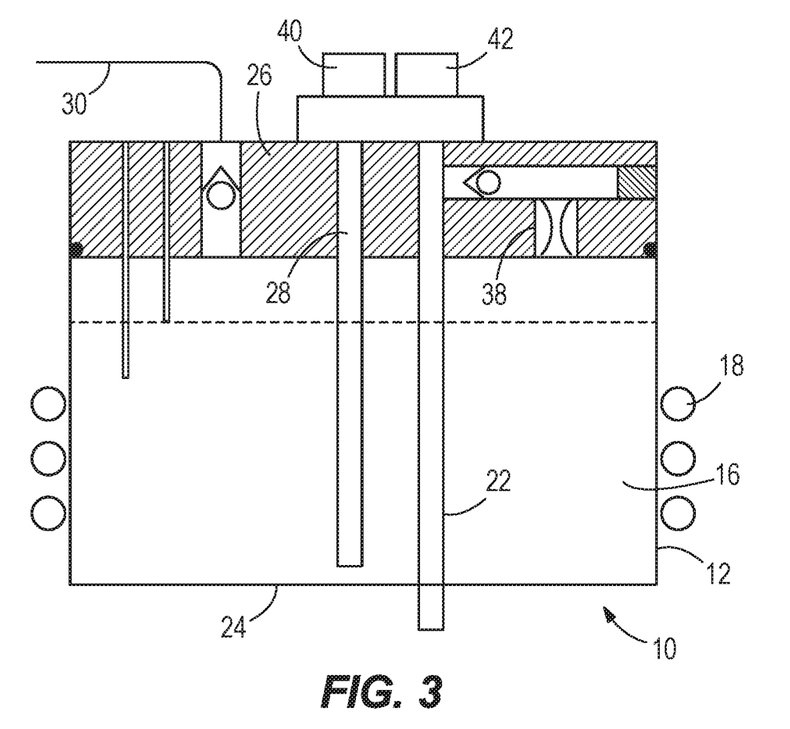
FIG. 3 is a sectional schematic view of a portion of the system shown in FIG. 2, particularly an upper cavity and a lid.

Referring now to FIGS. 2 and 3, a system 10 is provided for infusing a liquid, for example still water, with a gas, for example carbon dioxide or nitrogen, to thereby form a gas-infused beverage. The system 10 is not limited for use with any particular type of liquid or gas.

In the illustrated example, the system 10 includes a tank 12 having first and second cavities 14, 16. The tank 12 extends along an axis 15, and the second cavity 16 is vertically directly above the first cavity 14 along the axis 15. The system 10 also includes a refrigeration circuit that refrigerates the tank 12 and the contents of the first and second cavities 14, 16. Components of the refrigeration circuit are not shown in the drawings. However as explained in the incorporated '073 application, the refrigeration circuit can include a conventional refrigeration circuit having a condenser, compressor, and evaporator having an evaporator coil 18 that extends alongside the tank 12, and particularly alongside both the first and second cavities 14, 16. In the illustrated example, the evaporator coil 18 is wrapped around the tank 12 such that heat is exchanged between the relatively cold evaporator coil 18 and the contents of the first and second cavities 14, 16. Preferably the contents of the first and second cavities 14, 16 also exchange heat with each other. The evaporator coil 18 is clamped around the tank 12 such that evaporator coil 18 is in direct contact with the tank 12. In certain examples, the tank 12 with the evaporator coil 18 is pressed into a molded EPS insulation body (not shown) to keep the components in position and in contact with each other.

Figures 6A, 6B:
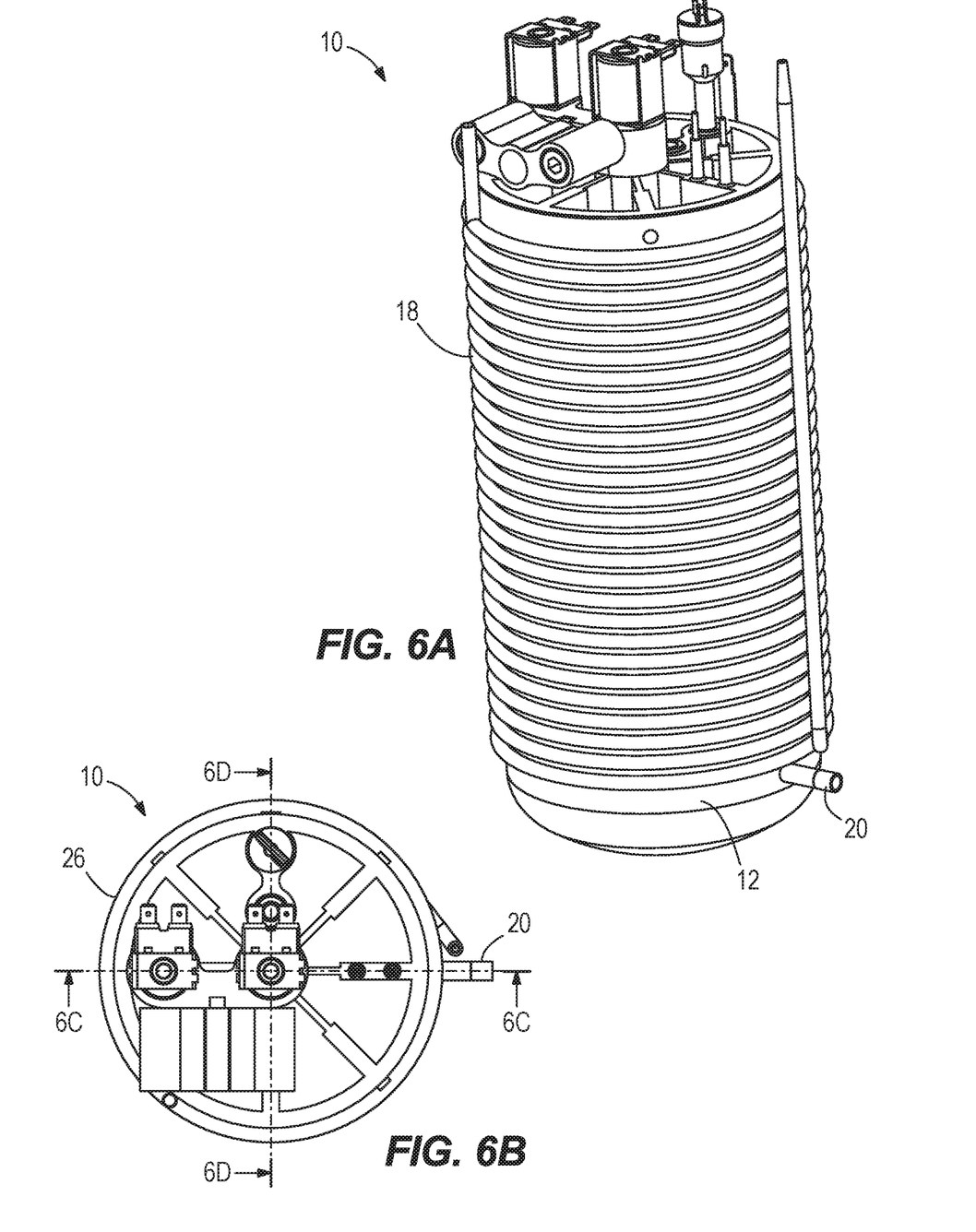
FIG. 6A is a perspective view of another system according to the present disclosure.
FIG. 6B is a top view of the system shown in FIG. 6A.
Figure 6C:
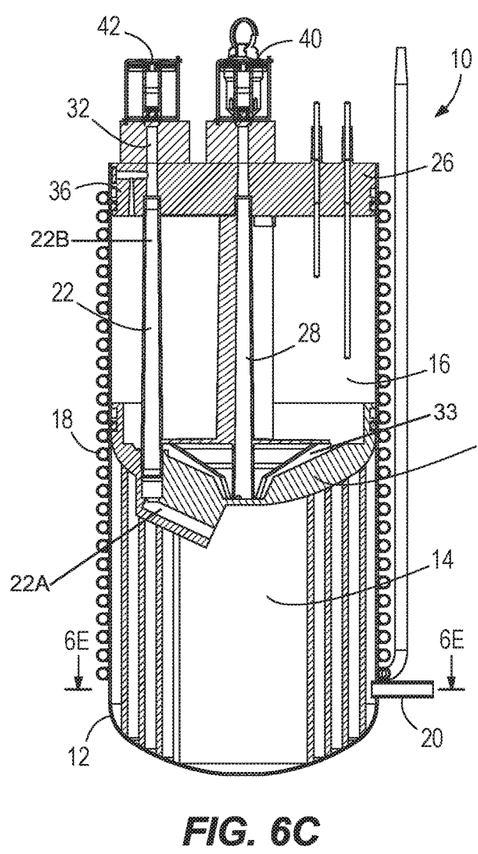
FIG. 6C is a cross-sectional view of the system shown in FIG. 6A along line 6C-6C shown in FIG. 6B.
Figure 6D:
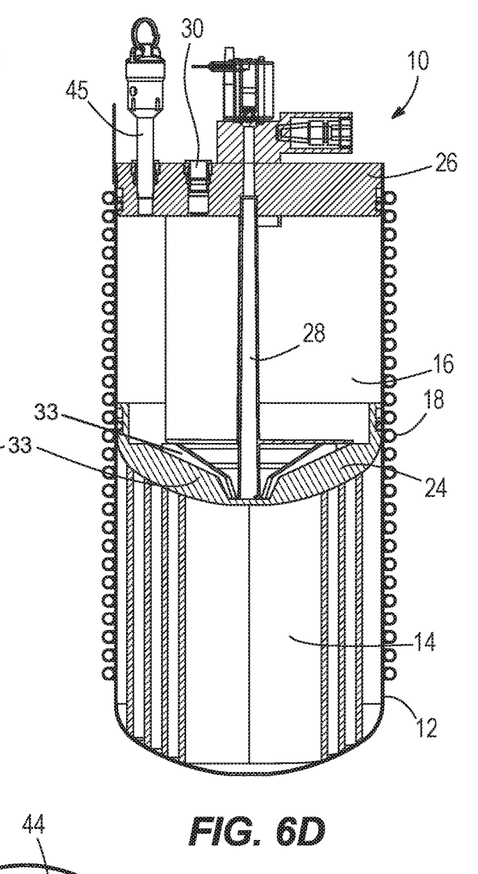
FIG. 6D is a cross-sectional view of the system shown in FIG. 6A along line 6D-6D shown in FIG. 6B.
Figure 6E:
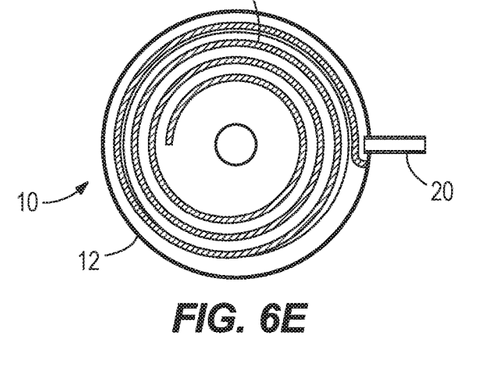
FIG. 6E is a cross-sectional view of the system shown in FIG. 6A along line 6E-6E shown in FIG. 6C.
Figure 7:
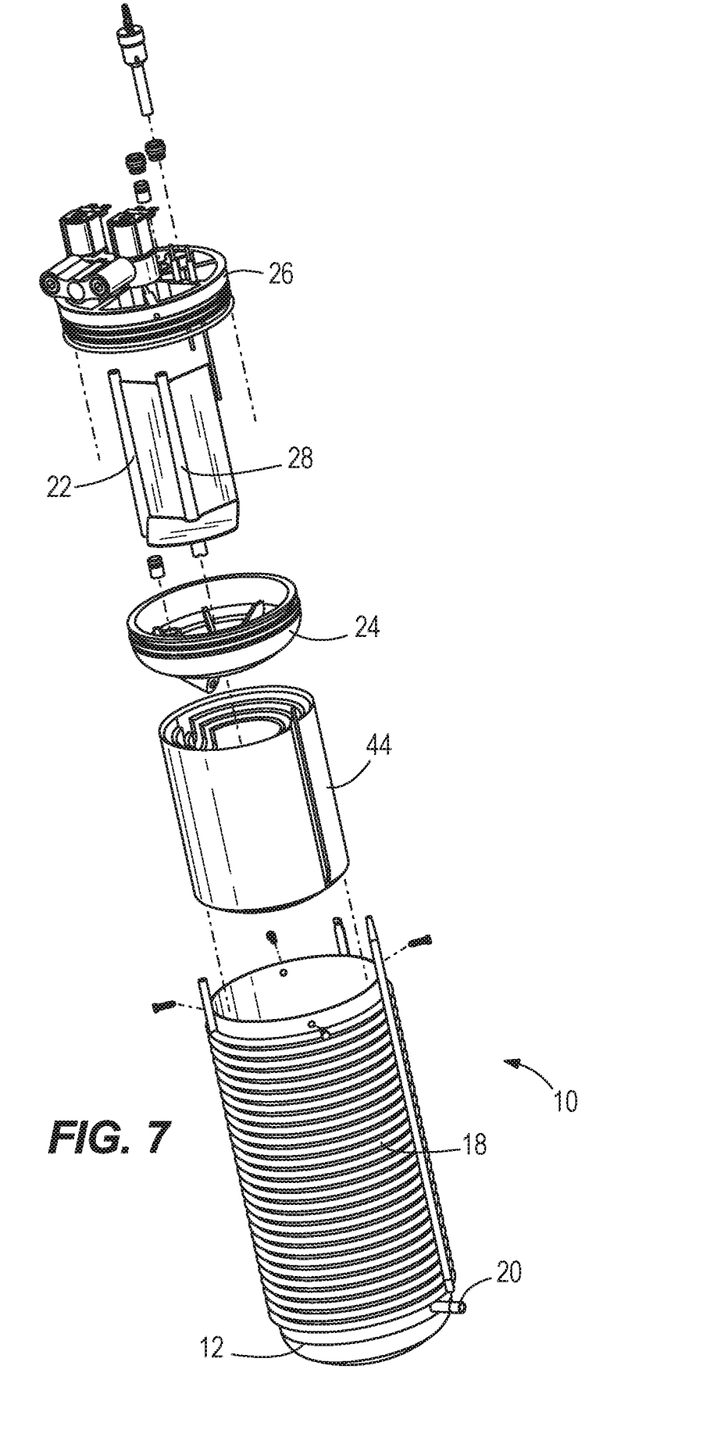
FIG. 7 is an exploded view of the system shown in FIG. 6A.

A liquid inlet 20 is connected to a source of liquid and is configured to supply the liquid to the first cavity 14. The liquid inlet 20 has a pressure reducer such that the pressure of the liquid entering the first cavity 14 is controlled to a desired pressure regardless of the pressure upstream from the liquid inlet 20. In the illustrated example, the liquid inlet 20 extends through the sidewall of the tank 12 at the location of the first cavity 14. A cavity inlet 22 supplies the liquid from the first cavity 14 to the second cavity 16. In certain examples, the cavity inlet 22 includes a first portion 22A that extends radially outwardly from the axis 15 toward the sidewall of the tank 12 and a second portion 22B that extends toward the lid 26 (FIG. 6C). In the example illustrated in FIG. 2, the cavity inlet 22 extends through a separator plate 24 that separates the first and second cavities 14, 16 and through a lid 26 on the tank 12. The shape of the separator plate 24 can vary. In FIG. 3, the separator plate 24 is a plate that is horizontally flat, and in FIG. 6C the separator plate 24 has a radially inwardly sloping surface that directs gas-infused beverage toward the axis 15 and radially inwardly sloping fins 33. The radially inwardly sloping surface ensures that the gas-infused beverage in the second cavity 14 is directed toward a beverage outlet 28 (described further herein) and completely conveyed out of second cavity 14. Conveying all of the gas-infused beverage out of the second cavity 14 is important for sanitation processes of the system. In one example, the separator plate 24 is configured to facilitate the noted heat exchange between the contents of the first and second cavities 14, 16. In the example depicted in FIG. 2, the cavity inlet 22 is radially offset from the axis 15.

Figure 5:
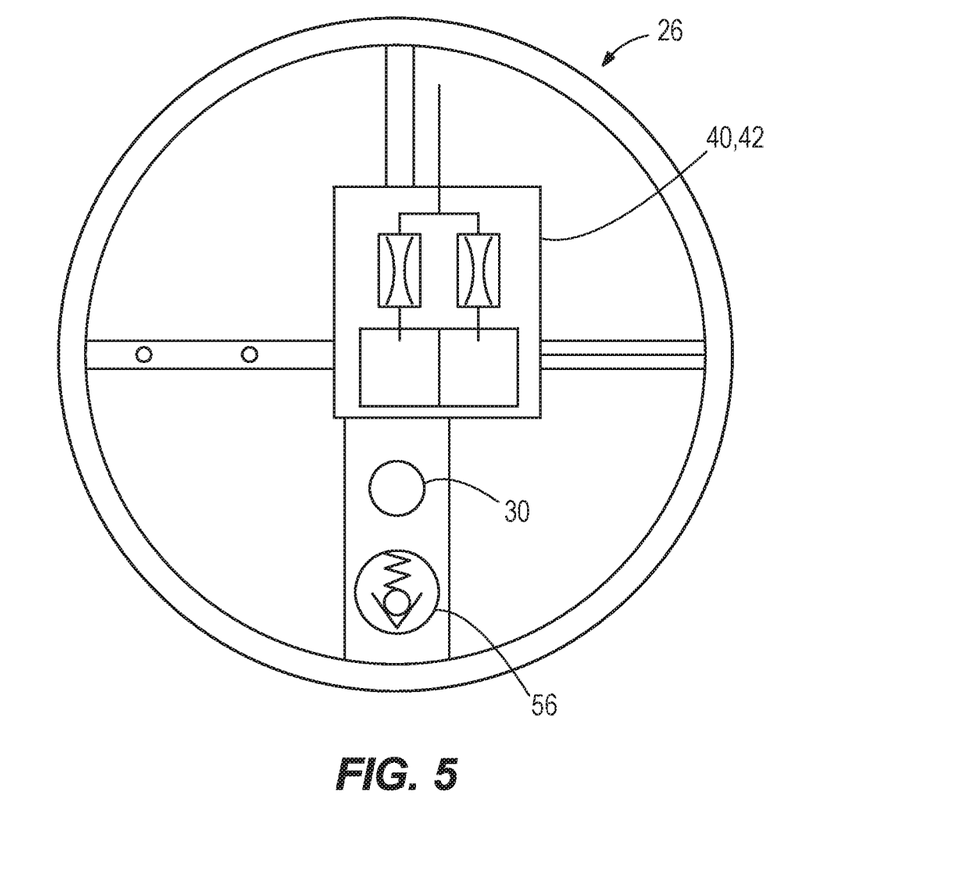
FIG. 5 is a schematic view of the lid.

Referring to FIGS. 2, 3 and 5, the lid 26 is connected to the tank 12 and seals with the tank 12 so that the second cavity 16 is isolated from the surrounding atmosphere. A beverage outlet 28 extends through the lid 26 and is configured to convey the gas-infused beverage from the second cavity 16 to a point of dispense for the user. A gas inlet 30 extends through the lid 26 and is connected to a source of pressurized gas. The gas inlet 30 is configured to supply the pressurized gas to the second cavity 16 such that the liquid in the second cavity 16 is infused with the gas to form the above-noted gas-infused beverage, which is then supplied to the beverage outlet 28 for dispensing to the user. A liquid outlet 32 extends through the lid 26 and is configured to convey the liquid from the first cavity 14 for dispensing to the user (e.g. liquid dispensed through the liquid outlet 32 is cooled but not gas-infused). Similar to the '073 application, the liquid in the first cavity 14 is conveyed via a common outlet conduit to a T-fitting 36 that distributes and conveys the liquid in parallel, either to the second cavity 16 for infusion with the gas or alternately to the liquid outlet 32. A pump (not shown) can be used to convey the cooled liquid and/or gas-infused beverage from the tank 12.

Referring to FIG. 3, a one-way check valve 38 prevents flow of gas-infused beverage into the common outlet conduit and the cavity inlet 22 from the second cavity 16. A solenoid valve 40 is integrated into the lid 26 and is configured to control flow of the gas-infused beverage through the beverage outlet 28. Another solenoid valve 42 is integrated into the lid 26 and is configured to control flow of the liquid through the liquid outlet 32. A relief valve 56 (FIG. 4) is configured to relieve gas from the second cavity 16.

Figure 4:
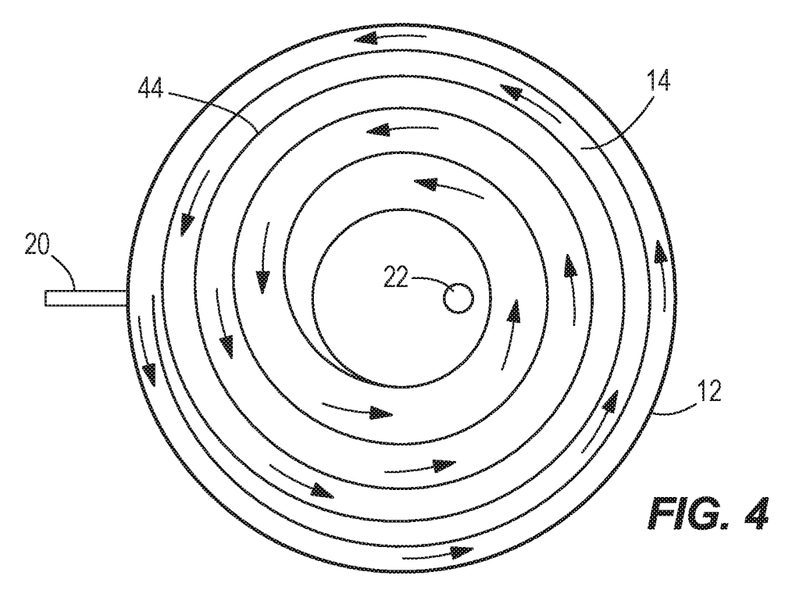
FIG. 4 is a sectional view looking upwardly at a lower cavity in the system.

Referring now to FIG. 4, a plurality of ribs 44 is disposed in the first cavity 14 and is configured to cause the liquid from the liquid inlet 20 to swirl around the first cavity 14 prior to being supplied to the second cavity 16. The swirling of the liquid around the first cavity 14 facilitates increased heat exchange between the contents of the first and second cavities 14, 16. The configuration of the ribs 44 can vary from what is shown. In the illustrated example, the ribs 44 are curved and extend between a base 46 of the tank 12 and the separator plate 24. The ribs 44 in this example support the separator plate 24 above the base 46. As is seen best in FIG. 4, the ribs 44 are radially spaced apart from each other so as to define discrete flow paths having relatively smaller width closer to an outer diameter of the first cavity 14 and a relatively larger width closer to the center of the first cavity 14. In this way, the liquid flow path remains substantially constant in cross section, promoting even heat exchange effects across the separator plate 24. In one example, the ribs 44 are constructed of a stainless steel sheet (0.2 millimeter thick stainless steel sheet) that is rolled up into the shape of a spiral. In other examples, the ribs 44 are made of injection molded plastic in the shape of a spiral. The ribs 44 are pressed into contact with the interior bottom surface of the first cavity 14, and at least one of the ribs 44 contacts the interior sidewall of the first cavity 14.

The system according to the present disclosure advantageously provides an increased reservoir of cooled liquid for supply to the second cavity or alternately directly to the user. The separator plate can be injection molded and sealed by an O-ring with the tank. The lid can be injection molded and sealed by an O-ring with the tank. The flow paths for the liquid in the first cavity are guided by the ribs, which can also provide support for the separator plate with respect to the base of the tank. Decreased number of tube connections are advantageously provided compared to the prior art—by integration of the T-fitting with the check valve and integration of two dispense valves with flow compensators in the lid.

FIGS. 6A-6E and 7 depict another embodiment of the system 10, with corresponding reference numbers applied.

Although the illustrated examples show the first cavity below the second cavity, in other examples the first and second cavities can be side-by-side or the first cavity can be above the second cavity.

In the present description, certain terms have been used for brevity, clarity and understanding. No unnecessary limitations are to be inferred therefrom beyond the requirement of the prior art because such terms are used for descriptive purposes only and are intended to be broadly construed. The different apparatuses, systems, and methods described herein may be used alone or in combination with other apparatuses, systems, and methods. Various equivalents, alternatives, and modifications are possible within the scope of the appended claims.

What is claimed is:

1. A system for infusing a liquid with a gas to form a gas-infused beverage, the system comprising a tank having first and second cavities; and at least one refrigeration circuit that refrigerates the tank and contents of the first and second cavities, wherein the liquid is supplied to the first cavity and cooled therein by the refrigeration circuit, wherein the liquid is then supplied to the second cavity and infused therein with the gas to thereby form the gas-infused beverage, and wherein the gas-infused beverage is then supplied to a beverage outlet for dispensing to a user, and further comprising a separator element that separates the first cavity from the second cavity, and at least one flow directing element that causes a liquid from the liquid inlet to swirl around in the first cavity prior to being supplied to the second cavity via a cavity inlet.

2. The system according to claim 1, further comprising the liquid inlet that supplies the liquid to the first cavity, wherein the liquid inlet is connected to a source of the liquid.

3. The system according to claim 1, further comprising a cavity inlet that supplies the liquid from the first cavity to the second cavity.

4. The system according to claim 3, further comprising a separator plate that separates the first cavity from the second cavity.

5. The system according to claim 4, wherein the first and second cavities are adjacent each other and separated by the separator plate such that contents of the first and second cavities exchange heat with each other.

6. The system according to claim 4, wherein the cavity inlet is formed through the separator plate.

7. The system according to claim 1, wherein the refrigeration circuit comprises an evaporator coil that is wrapped around the tank.

8. The system according to claim 7, wherein the evaporator coil extends alongside both of the first and second cavities.

9. The system according to claim 1, further comprising a lid that seals the second cavity.

10. The system according to claim 9, wherein the beverage outlet is formed in the lid.

11. The system according to claim 10, further comprising a solenoid valve integrated in the lid and configured to control flow of the gas-infused beverage through the beverage outlet.

12. The system according to claim 1, further comprising a liquid outlet that conveys the liquid from the first cavity for dispensing to a user.

13. The system according to claim 12, wherein the liquid in the first cavity is conveyed via a common outlet conduit to a T-fitting that distributes the liquid in parallel to the second cavity for infusion with gas and alternately to the liquid outlet.

14. The system according to claim 13, further comprising a one-way check valve preventing flow of gas-infused beverage into the common outlet conduit from the second cavity.

15. The system according to claim 12, further comprising a solenoid valve integrated in the lid and configured to control flow of the liquid through the liquid outlet.

16. The system according to claim 1, further comprising a relief valve configured to relieve the gas from the second cavity.

17. The system according to claim 1, wherein the liquid is still water and wherein the gas is carbon dioxide.

18. The system according to claim 1, wherein the at least one refrigeration circuit consists of one refrigeration circuit.

19. The system according to claim 1, wherein the separator element comprises a plate.

20. The system according to claim 1, wherein the flow directing element comprises at least one rib.

21. A system for infusing a liquid with a gas to form a gas-infused beverage, the system comprising a tank having first and second cavities; and a refrigeration circuit that refrigerates the tank and contents of the first and second cavities, wherein the liquid is supplied to the first cavity and cooled therein by the refrigeration circuit, wherein the liquid is then supplied to the second cavity and infused therein with the gas to thereby form the gas-infused beverage, and wherein the gas-infused beverage is then supplied to a beverage outlet for dispensing to a user; a separator plate that separates the first cavity from the second cavity; and a plurality of ribs that causes the liquid from a liquid inlet to swirl around the first cavity prior to being supplied to the second cavity via a cavity inlet.

22. The system according to claim 21, wherein the tank comprises a base and wherein the plurality of ribs supports the separator plate with respect to the base.

23. The system according to claim 22, wherein the plurality of ribs defines flow paths having a relatively smaller width closer to an outer diameter of the first cavity and a relatively larger width closer to a center of the first cavity.

* * * * *